April 21, 1953 A. L. ROBB 2,635,619
FLUID MOTOR VENT CHECK VALVE ASSEMBLY
Filed Feb. 20, 1950 2 SHEETS—SHEET 1

INVENTOR
Alexander L. Robb.

BY
Cameron, Kerkam & Sutton ATTORNEYS

April 21, 1953  A. L. ROBB  2,635,619
FLUID MOTOR VENT CHECK VALVE ASSEMBLY
Filed Feb. 20, 1950  2 SHEETS—SHEET 2

INVENTOR
Alexander L. Robb.

BY
Cameron, Kerkam & Sutton ATTORNEYS

Patented Apr. 21, 1953

2,635,619

UNITED STATES PATENT OFFICE 2,635,619

FLUID MOTOR VENT CHECK VALVE ASSEMBLY

Alexander L. Robb, Redwood City, Calif., assignor to Hodges Research and Development Company, Redwood City, Calif., a corporation of California Application February 20, 1950, Serial No. 145,106

5 Claims. (Cl. 137—112)

1

This invention relates to fluid motor vent check valve assemblies and more particularly to such assemblies for use with fluid motors which move during use and which are reversible by reversing the direction of fluid flow thereto. More particularly this invention relates to fluid motor vent check valve assemblies in which the vent conduit from the motor housing is in communication with the fluid pressure supply line and with the fluid return line of the fluid motor through check valves which automatically connect the vent conduit to the low pressure or fluid return line.

In the co-pending application of William C. Hodges and Alexander L. Robb, Serial No. 124,592, filed October 31, 1949, a fluid motor powered mechanism is there disclosed and claimed having a sprocket to move the powered mechanism along a track to supply motive power for transferring less than carload lot containers to and from various means of transportation. The fluid motor of this powered mechanism is supplied with fluid under pressure from a suitable source through a supply line and a return line is provided from the motor housing to return the fluid from the motor to the source of fluid under pressure. The supply and return lines are suitable flexible conduits of considerable length to allow for the travel of the powered mechanism on the tracks. The fluid motor there disclosed can be any of the various fluid motors known to the art and reversal of the motor and reversal of the direction of movement of the powered mechanism is obtained by reversing the conduit or line applying fluid under pressure to the motor. In other words, when the direction of movement of the motor is reversed the line formerly supplying fluid under pressure becomes the return line and the line formerly the return line becomes the line for fluid under pressure.

All commercially available fluid motors of the type suitable for use with this mechanism require a vent from the motor housing to vent fluid therefrom leaking around the various parts of the motor and such a vent is customarily connected to the low pressure or return line of the motor to return the vented fluid to the source of fluid supply. However, when it is desirable to reverse the direction of rotation of the motor at will it is necessary to suitably connect the vent line so that it will be automatically placed in communication with whichever of the two motor lines is the low pressure line. The fluid motor vent check valve assembly of the present invention automatically accomplishes the connection

2 of the motor vent line to whichever of the motor lines is the low pressure line.

It is accordingly an object of the present invention to provide a fluid motor vent check valve assembly in which the fluid motor vent line is automatically connected to whichever of the fluid motor lines is the low pressure or return line.

Another object of the present invention is to provide such a vent check valve assembly which may readily and easily be installed on conventional fluid motors.

Another object is to provide such a vent check valve assembly which is compact; of simple design and construction; and which includes connections for the fluid motor lines.

Other and further objects of the present invention will appear from the following description.

The vent novel check valve assembly of the present invention is capable of various mechanical embodiments one of which is shown in the accompanying drawing and is described hereinafter for purposes of illustrating the same. This illustrative embodiment of the present invention should in no way be construed as defining or limiting the same and reference should be had to the appended claims for this purpose.

In the accompanying drawings, in which like reference characters indicate like parts, Fig. 1 is a side view of a fluid motor having one embodiment of the novel fluid motor vent check valve assembly of the present invention incorporated therewith;

Fig. 3 is a cross-sectional view on the line 3—3 of Fig. 2; and

Figure 1:
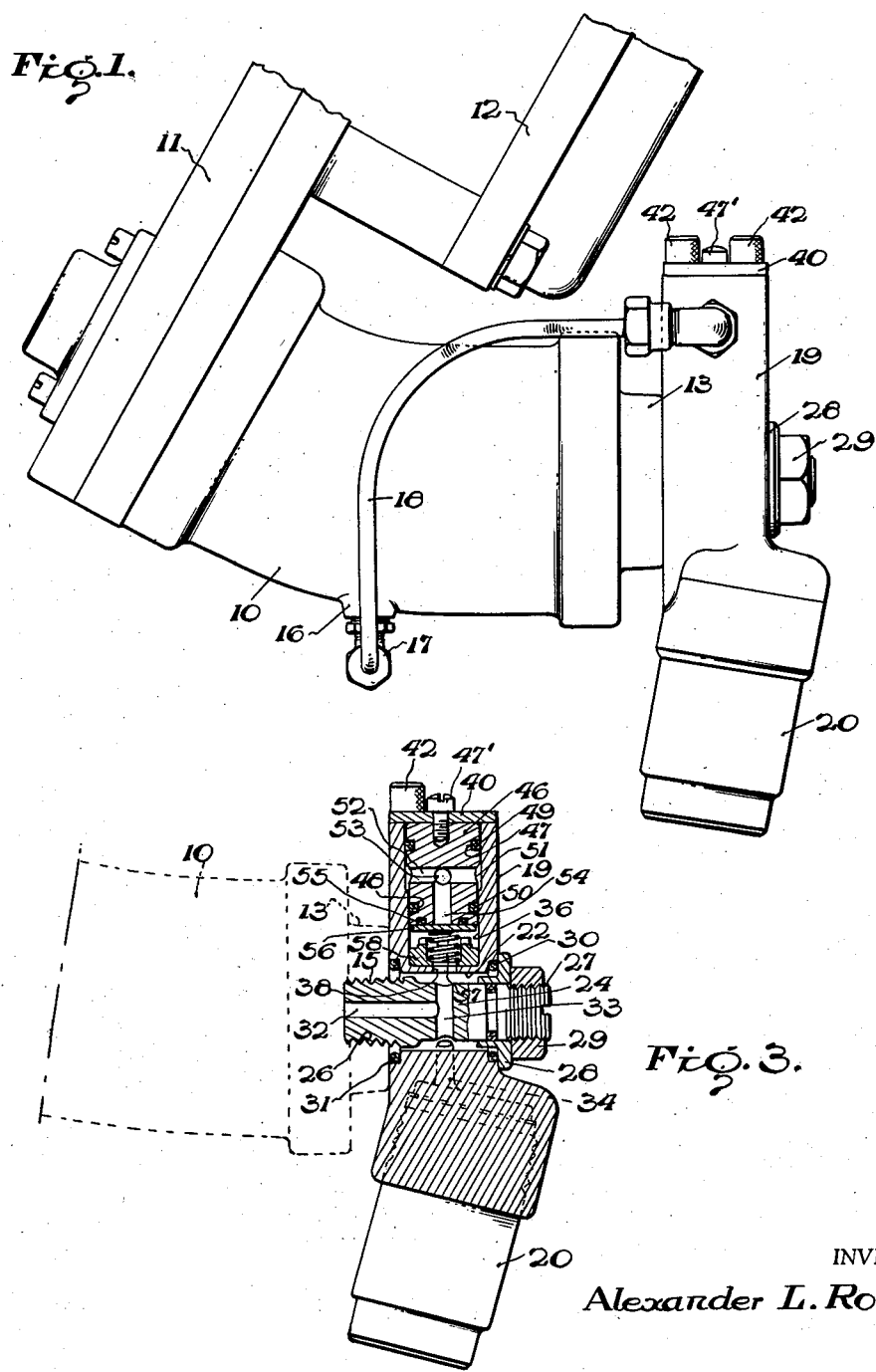
Figure 2:
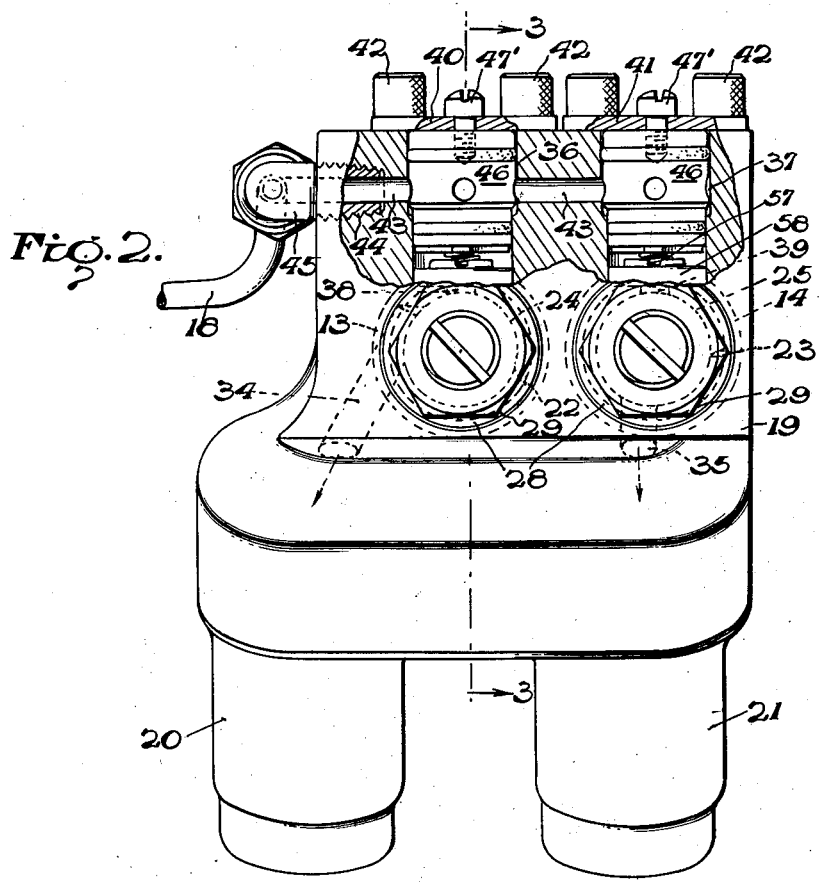
Fig. 2 is an end view of the check valve assembly of Fig. 1 partially in section to show the positioning of the several parts thereof.

Referring now to the several figures, and in particular to Figs. 1 and 2, 10 is the housing of any conventional fluid motor driven by fluid under pressure. A suitable rotor, not shown, is mounted in housing 10 and drives a shaft, which is not shown, which in turn supports a gear, not shown, in housing 11 and this gear may be a part of the gear train described in the above identified application which gear train is mounted within the framework generally indicated at 12. Housing 10 is provided with a pair of outwardly extending bosses 13 and 14 to receive the fluid lines to supply fluid to and to return fluid from the motor. Bosses 13 and 14 are provided with conduits extending into the motor and these conduits may be internally threaded at 15. Housing 10 is provided with a fluid vent aperture 16 into which may be screwed an elbow 17 and a suitable vent line 18 is in communication with elbow 17.

The novel fluid motor vent check valve assembly of the present invention is mounted on bosses 13 and 14 and comprises a housing 19 which is provided with suitable couplings 20 and 21 to receive the fluid motor lines. Connections 20 and 21 may if desirable be any suitable type of quick connect coupling. Housing 19 is provided with a pair of cylindrical chambers 22 and 23 to receive studs 24 and 25 respectively and studs 24 and 25 are threaded at their inner ends at 26 for engagement with threads 15 within bosses 13 and 14. Studs 24 and 25 pass through block 19 and are threaded at their outer extremities at 27. A washer 28 and nut 29 are mounted on the outer extremity of studs 24 and 25 to lock housing 19 against bosses 13 and 14. Gaskets 30 and 31 and an O ring on stud 24 may be provided to obtain a fluid tight seal between washer 28 and housing 19; between housing 19 and bosses 13 and 14 respectively (Fig. 3); and between stud 24 and washer 28. Studs 24 and 25 are axially bored at 32 and bore 32 opens into a cross conduit 33. Conduit 33 of stud 24 is in communication with passage 34 leading from coupling 20 and conduit 33 of stud 25 is in communication with passage 35 leading from coupling 21.

Housing 19 is also provided with a pair of chambers 36 and 37 to receive the check valves to be described in more detail hereinafter. Chamber 36 communicates through opening 38 with chamber 22 and conduit 33 of stud 24 and chamber 37 communicates through opening 39 with chamber 23 and conduit 33 of stud 25. Chambers 36 and 37 are preferably of cylindrical form and are closed at their upper ends by plates 40 and 41 respectively which are secured to housing 19 by suitable screws or studs 42. A passage 43, hereinafter referred to as the vented fluid conduit, is suitably formed in block 19 and communicates with chambers 36 and 37. Passage 43 is suitably internally threaded at 44 to receive elbow 45 which in turn is connected to and communicates with vent line 18. Fluid vented from motor housing 10 will therefore pass through line 18 into conduit 43 and into the check valve chambers 36 and 37.

Figure 4:
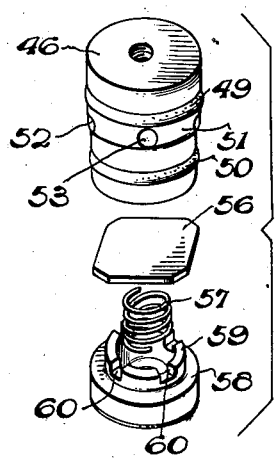
Fig. 4 is an expanded view of the several elements of one of the check valves.

A suitable check valve is mounted in chambers 36 and 37, which is shown more particularly in Figs. 3 and 4, and is seen to comprise a valve seat member 46 which is secured to the adjacent cover plate 40 or 41 by a suitable stud 47'. Seat member 46 is circumferentially grooved at 47 and 48 to receive suitable gaskets 49 and 50 respectively to form fluid tight seals with chambers 36 and 37. Seat member 46 is also circumferentially cut away at 51 and is cross bored at 52 and 53. Seat member 46 is also axially bored at 54 and bore 54 communicates with the intersection of cross bores 52 and 53 and opens through the lower end of seat 46. Seat member 46 may also mount a suitable gasket 55 in its lower end to form a fluid tight seal with the valve element 56.

Valve element 56 is shown in detail in Fig. 4 and is seen to comprise an octagon shaped element fitting loosely in chambers 36 or 37 to permit the passage of fluid around the edges thereof. Valve element 56 is held in engagement with the underside of seat member 46 and against gasket 55 by spring 57. Spring 57 is mounted in a suitable spring seat and valve stop member 58 which is carried in the bottom of chambers 36 and 37. Spring seat and valve stop member 58 is provided with upstanding portions 59 to stop downward movement of valve element 56 and when valve element 56 is resting on elements 59 fluid can flow through ports 60 into openings 38 or 39.

With my novel fluid motor vent check valve assembly assembled as above described with a fluid motor whose direction of rotation is reversible assume that fluid under pressure is first supplied to the motor through the conduit or line connecting with coupling 21. The line connecting with coupling 20 is therefore the low pressure or return line. Fluid under pressure from coupling 21 passes through conduit 35 into chamber 23 and thence through conduits 33 and 32 in stud 25 into the motor housing 10. Fluid under pressure also passes from conduit 33 of stud 25 into aperture 39 into the lower end of chamber 37 and passing upwardly through spring seat and valve stop member 58 impinges against the under surface of valve element 56 and forces the same against gasket 55 to close fluid communication through seat member 46. Fluid returning from motor housing 10 passes through conduit 32 of stud 24 and into conduit 33 thereof and thence outwardly through conduit 34 to coupling 20 for return to the source of fluid. The fluid passing through conduits 32, 33, 34 and through coupling 20 creates a negative pressure through orifice 38 within chamber 36 so that the only force holding valve element 56 against seat in chamber 36 is that of spring 57. During operation of the motor fluid will leak past the moving elements thereof into the housing 10 and will pass outwardly therefrom through orifice 16 and into conduit 18 and will pass from conduit 18 to vented fluid conduit 43 in valve block 19. The fluid in conduit 43 will be under pressure which is not sufficient to overcome the sum of the pressures of the fluid and of the spring pressure acting against valve element 56 in chamber 37 but is sufficient to overcome the spring pressure which is the sole pressure acting against valve element 56 in chamber 36. Consequently valve element 56 will be moved away from seat 46 and the fluid in conduit 43 will pass around valve element 56 and through orifice 38 into chamber 22 and into conduit 33 and thence through conduit 34 into coupling 20 for return to the source of fluid.

If the direction of rotation of the motor is now reversed fluid under pressure is supplied to coupling 20 and coupling 21 becomes the low pressure or return line coupling. Under these circumstances the valve element 56 in chamber 36 is held against its valve seat by the combined forces of its spring and of the pressure of the incoming fluid and the valve element 56 in chamber 37 is held against its seat by the force of its spring 57 alone. Vented fluid under pressure in conduit 43 will then open the valve element 56 in chamber 37 and the vented fluid will pass through orifice 39 into chamber 23 and through conduit 35 into coupling 21 for return to the source of fluid. It is therefore obvious that no matter which of couplings 20 or 21 may be the pressure coupling and which may be the return coupling the check valves provided in chambers 36 and 37 will automatically admit fluid vented from housing 10 to the low pressure or return coupling for return to the source of fluid.

It will now be apparent that by the present invention I have provided a novel fluid motor vent check valve assembly which in every way satisfies the several objectives defined above and which automatically admits vented fluid to the low pressure or return line of the motor.

Changes to or modifications of the above described illustrative embodiment of my invention may now be suggested to those skilled in the art without departing from my inventive concept and reference should be had to the appended claims to determine the scope of this invention.

What is claimed is:

1. In a valve assembly as described including a fluid motor housing having a pair of motor fluid conduits therein, a fluid vent aperture, and hollow studs extending from the pair of motor fluid conduits, a valve housing, a pair of chambers in said housing to receive the studs, a motor fluid line coupling mounted on said housing and communicating with one of said chambers, a second motor fluid line coupling communicating with the other of said chambers, the hollow studs connecting said chambers and the adjacent one of the pair of conduits, a check valve chamber in communication with each of said pair of chambers, a check valve in each of said check valve chambers normally blocking communication through said chambers, a vented fluid conduit in said housing communicating with said check valve chambers and in communication with the vent aperture, and means resiliently urging said check valves toward closed position against the pressure of the vented fluid in said vented fluid conduit.

2. In a valve assembly as described including a fluid motor housing having a pair of motor fluid conduits, a fluid vent aperture, a valve housing, and means for securing the valve housing to the motor housing over the motor fluid conduits, a pair of chambers in the valve housing in communication with the adjacent motor fluid conduit, a motor fluid line coupling communicating with each of said chambers, a check valve chamber in the valve housing communicating with each of said pair of chambers, a check valve in each of said check valve chambers normally blocking communication through said chambers, a vented fluid conduit in the valve housing communicating with said check valve chambers and in communication with the fluid vent aperture, and means resiliently urging said check valves toward closed position against the pressure of the vented fluid in said vented fluid conduit.

3. In a valve assembly as described including a fluid motor housing having a pair of motor fluid conduits, a fluid vent aperture, and a valve housing, a fluid passage through the valve housing communicating with one of the motor fluid conduits, a second fluid passage through said housing communicating with the other of the motor fluid conduits, a check valve chamber for each of said fluid passages and in communication therewith, a check valve in each of said check valve chambers normally blocking communication through said chambers, a vented fluid conduit in the valve housing communicating with said check valve chambers and in communication with the fluid vent aperture and means resiliently urging said check valves toward closed position against the pressure of the vented fluid in said vented fluid conduit.

4. A valve assembly as described in claim 3 in which each of said check valves includes a valve seat member closing one end of the associated check valve chamber, a conduit in said seat member communicating with said vented fluid conduit, a valve element in said valve chamber, and a spring urging said valve element into engagement with said valve seat member to close said conduit.

5. A valve assembly as described in claim 3 in which each of said check valve chambers opens through a side of said housing, and in which each of said check valves includes a valve seat member closing the open end of the associated check valve chamber, a plate secured to said seat member and to the side of said housing, a conduit in said seat member communicating with said vented fluid conduit, a valve element in said valve chamber, and resilient means urging said valve element into engagement with said valve seat member to close said conduit.

ALEXANDER L. ROBB.

References Cited in the file of this patent

UNITED STATES PATENTS

| Number | Name | Date |
|---|---|---|
| 1,503,646 | Fish | Aug. 5, 1924 |
| 2,090,512 | Ernst | Aug. 17, 1937 |
| 2,399,907 | Blair | May 7, 1946 |
| 2,400,658 | Sheppard | May 21, 1946 |